(12) United States Patent
Baehr-Jones et al.

(10) Patent No.: US 12,273,148 B2
(45) Date of Patent: Apr. 8, 2025

(54) SYSTEM AND METHOD FOR OPTICAL COMMUNICATION

(71) Applicant: Luminous Computing, Inc., Santa Clara, CA (US)

(72) Inventors: Thomas W. Baehr-Jones, Santa Clara, CA (US); Hari Shankar, Santa Clara, CA (US); Florian Bohn, Santa Clara, CA (US)

(73) Assignee: Luminous Computing, Inc., Santa Clara, CA (US)

( * ) Notice: Subject to any disclaimer, the term of this patent is extended or adjusted under 35 U.S.C. 154(b) by 183 days.

(21) Appl. No.: 18/047,500

(22) Filed: Oct. 18, 2022

(65) Prior Publication Data
US 2023/0121555 A1    Apr. 20, 2023

Related U.S. Application Data

(60) Provisional application No. 63/277,506, filed on Nov. 9, 2021, provisional application No. 63/277,499, filed on Nov. 9, 2021, provisional application No. 63/257,379, filed on Oct. 19, 2021.

(51) Int. Cl.
*H04B 10/61*    (2013.01)
*H04B 10/50*    (2013.01)
*H04B 10/63*    (2013.01)

(52) U.S. Cl.
CPC ....... *H04B 10/63* (2013.01); *H04B 10/50597* (2013.01); *H04B 10/61* (2013.01)

(58) Field of Classification Search
CPC ............... H04B 10/50–588; H04B 10/61–63
See application file for complete search history.

(56) References Cited

U.S. PATENT DOCUMENTS

| | | | | |
|---|---|---|---|---|
| 9,240,843 B1* | 1/2016 | Malouin | ............... | H04B 10/616 |
| 2008/0267638 A1* | 10/2008 | Nakashima | ............ | H04B 10/60 |
| | | | | 398/208 |
| 2015/0155952 A1* | 6/2015 | Lach | ...................... | H04B 10/61 |
| | | | | 398/201 |

\* cited by examiner

*Primary Examiner* — Nathan M Cors
(74) *Attorney, Agent, or Firm* — Stratford Group Ltd.

(57) ABSTRACT

Mixing between I and Q components in coherent homodyne optical signals can occur due to phase shifts, e.g. relative to the local oscillator, relative to the other signal components. In some examples, the phase shifts can arise due to thermal expansion of the optical waveguides and/or can include polarization mixing. A descrambler functions to correct for mixing between multiple signal components. The descrambler may be configured to at least partially correct for a phase difference between a first plurality of modulated optical data signals and a first local oscillator reference signal; and a controller may be configured for determining a first correction parameter for at least partially correcting for the phase difference, and for transmitting the first correction parameter to the descrambler. The controller may be configured for determining the first correction parameter from a first pilot signal transmitted with the first plurality of modulated optical data signals.

19 Claims, 9 Drawing Sheets

SYSTEM AND METHOD FOR OPTICAL COMMUNICATION

CROSS-REFERENCE TO RELATED APPLICATIONS

This application claims the benefit of U.S. Provisional Application Nos. 63/257,379, filed Oct. 19, 2021; 63/277,499, filed Nov. 9, 2021; and 63/277,506, filed Nov. 9, 2021 which are hereby incorporated by reference in their entirety.

TECHNICAL FIELD

The present disclosure relates to an optical communication system, and in particular to an optical communication system including a descrambler configured to correct for mixing between multiple signal components.

BACKGROUND

Mixing can occur between multiple optical signal components, for example mixing between I and Q coherent heterodyne components, such as due to phase shifts e.g. relative to the local oscillator, relative to the other signal components, etc. In some examples, these phase shifts can arise due to thermal expansion of the optical waveguides, but can additionally or alternatively include phase shifts arising for any other suitable reasons. Additionally or alternatively, this can include polarization mixing, such as occurring in the optical link, e.g. within a single mode optical fiber.

SUMMARY

Accordingly, a first apparatus includes an optical system comprising:
- a transmitter for transmitting optical signals onto an optical link, comprising: an optical source configured for generating a first plurality of coherent homodyne optical signals, and a first local oscillator reference signal; and a first optical modulator configured for modulating the first plurality of coherent homodyne optical signals forming a first plurality of modulated optical data signals, comprising a first in-phase modulated optical data signal and a first quadrature modulated optical data signal; and
- a receiver comprising: a first optical hybrid configured for generating a first in-phase electrical data signal and a first quadrature electrical data signal from the first in-phase modulated optical data signal, the first quadrature modulated optical data signal and the first local oscillator reference signal; a descrambler configured for at least partially correcting for a first phase difference between the first plurality of modulated optical data signals and the first local oscillator reference signal; and a controller configured for determining a first correction parameter for at least partially correcting for the first phase difference, and for transmitting the first correction parameter to the descrambler.

In any of the aforementioned embodiments, the first optical modulator may also configured for generating a first pilot signal for transmission with the first plurality of coherent homodyne optical signals; and the controller may be configured for determining the first correction parameter from the first pilot signal.

In any of the aforementioned embodiments the first pilot signal may have a frequency greater than or equal to 10 times lower in frequency than the first plurality of coherent homodyne optical signals.

In any of the aforementioned embodiments the descrambler may be configured to receive the first in-phase electrical data signal and the first quadrature electrical data signal, and to perform a single virtual rotation in I-Q space/phase space for at least partially correcting for the first phase difference.

In any of the aforementioned embodiments the descrambler may further comprises an optical descrambler including an optical phase shifter for at least partially correcting for the first phase difference.

In any of the aforementioned embodiments the controller may be configured to perform an iterative optimization process to reduce the first phase difference, wherein the first correction parameter provided to the descrambler are updated based on an effect the descrambler has on measurements of the first pilot signal using the first correction factor.

In any of the aforementioned embodiments the transmitter may be configured to transmit the first pilot tone on only one of the first in-phase modulated optical data signal and the first quadrature modulated optical data signal; wherein when a portion of the first pilot signal is detected on the other of the first in-phase modulated optical data signal and the first quadrature modulated optical data signal, the controller may be configured to adjust the first correction parameter in order to reduce a magnitude of an electrical signal corresponding to the portion of the first pilot signal.

In any of the aforementioned embodiments the descrambler may be configured to separate the first pilot signal from the first plurality of modulated optical data signals.

In any of the aforementioned embodiments the optical system may further comprises:
- a second optical source configured for generating a second plurality of coherent homodyne optical signals at a different wavelength than the first plurality of coherent homodyne optical signals, and a second local oscillator reference signal;
- a second optical modulator configured for modulating the second plurality of coherent homodyne optical signals forming a second plurality of modulated optical data signals, comprising a second in-phase modulated optical data signal and a second quadrature modulated optical data signal, and for generating a second pilot signal;
- a first optical multiplexer configured for combining the first plurality of modulated optical data signals and the second plurality of modulated optical data signals into a combined optical signal;
- a second optical multiplexer configured for combining the first local oscillator reference signal and the second local oscillator reference signal into a combine reference signal;
- an optical link for transmitting the combined optical signal, the combined reference signal, and the first and second pilot signals;
- a first optical demultiplexer configured for separating the combined optical signal into the first plurality of modulated optical data signals and the second plurality of modulated optical data signals;
- a second optical demultiplexer configured for separating the combined reference signal into the first local oscillator reference signal and the second local oscillator reference signal; and
- a second optical hybrid configured for generating a second in-phase electrical data signal and a second quadrature electrical data signal from the second in-phase modulated optical data signal, the second quadrature modulated optical data signal and the second local oscillator reference signal;

wherein the descrambler is also configured for at least partially correcting a second phase difference between the second plurality of modulated optical data signals and the second local oscillator reference signal; and wherein the controller is also configured for determining second correction parameters from the second pilot signal for at least partially correcting the second phase difference, and for transmitting the second correction parameters to the descrambler.

In any of the aforementioned embodiments the optical system:
the first plurality of coherent homodyne optical signals may comprise: four coherent homodyne optical signals, including a first polarized in-phase modulated optical data signal and a second polarized quadrature modulated optical data signal;
the first optical modulator may be further configured for modulating the first polarized in-phase modulated optical data signal and the second polarized quadrature modulated optical data signal;
the optical system may further comprise: a first optical multiplexer configured for combining the first plurality of modulated optical data signals; and a first optical demultiplexer configured for separating the combined optical signal into the first plurality of modulated optical data signals.

In another embodiment, an optical system comprises:
a receiver configured to receive a first in-phase modulated optical data signal, a first quadrature modulated optical data signal and a first local oscillator reference signal comprising:
a first optical hybrid configured for generating a first in-phase electrical data signal and a first quadrature electrical data signal from the first in-phase modulated optical data signal, the first quadrature modulated optical data signal and the first local oscillator reference signal;
a descrambler configured for at least partially correcting a first phase difference between the first plurality of modulated optical data signals and the first local oscillator reference signal; and
a controller configured for determining a first correction parameter for at least partially correcting the first phase difference, and for transmitting the first correction parameter to the descrambler.

In any of the aforementioned embodiments the controller may be configured for determining the first correction parameter from the first pilot signal.

In any of the aforementioned embodiments the first pilot signal may have a frequency greater than or equal to 10 times lower in frequency than the first plurality of coherent homodyne optical signals.

In any of the aforementioned embodiments the descrambler may be configured to receive the first in-phase electrical data signal and the first quadrature electrical data signal, and to perform a single virtual rotation in I-Q space/phase space for at least partially correcting the first phase difference.

In any of the aforementioned embodiments the descrambler may further comprise an optical descrambler including an optical phase shifter for at least partially correcting the phase difference.

In any of the aforementioned embodiments the descrambler may comprise an optical descrambler including an optical phase shifter for at least partially correcting the first phase difference.

In any of the aforementioned embodiments the controller may be configured to perform an iterative optimization process to reduce the first phase difference, wherein the first correction parameter provided to the descrambler may be updated based an effect the descrambler has on measurements of the first pilot signal using the first correction factor.

In any of the aforementioned embodiments the transmitter may be configured to transmit the first pilot signal on only one of the first in-phase modulated optical data signal and the first quadrature modulated optical data signal;
wherein when a portion of the first pilot signal is detected on the other of the first in-phase modulated optical data signal and the first quadrature modulated optical data signal, the controller is configured to adjust the first correction parameter in order to reduce a magnitude of an electrical signal corresponding to the portion of the first pilot signal.

In any of the aforementioned embodiments the descrambler may be configured to separate the first pilot signal from the first plurality of modulated optical data signals.

BRIEF DESCRIPTION OF THE DRAWINGS

Some example embodiments will be described in greater detail with reference to the accompanying drawings, wherein.

DETAILED DESCRIPTION

While the present teachings are described in conjunction with various embodiments and examples, it is not intended that the present teachings be limited to such embodiments. On the contrary, the present teachings encompass various alternatives and equivalents, as will be appreciated by those of skill in the art.

The following description of the preferred embodiments of the invention is not intended to limit the invention to these preferred embodiments, but rather to enable any person skilled in the art to make and use this invention.

Figure 1A:
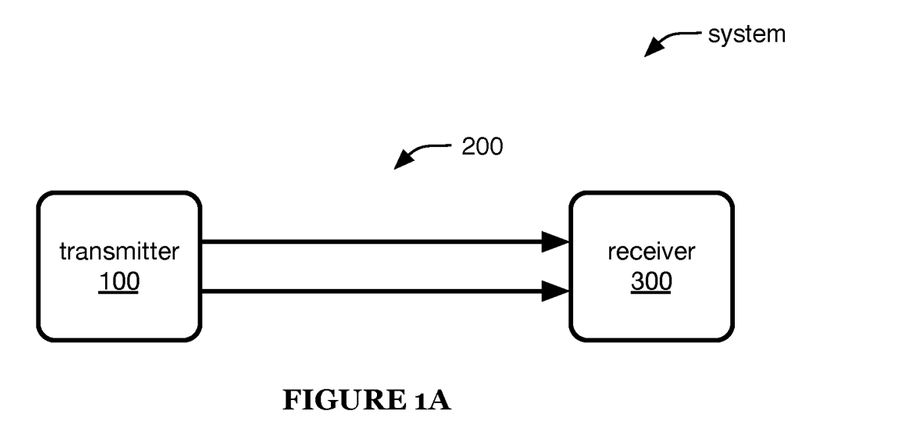
FIGS. 1A-1B are schematic representations of a first and second embodiment, respectively, of a system for optical communication.
Figure 1B:
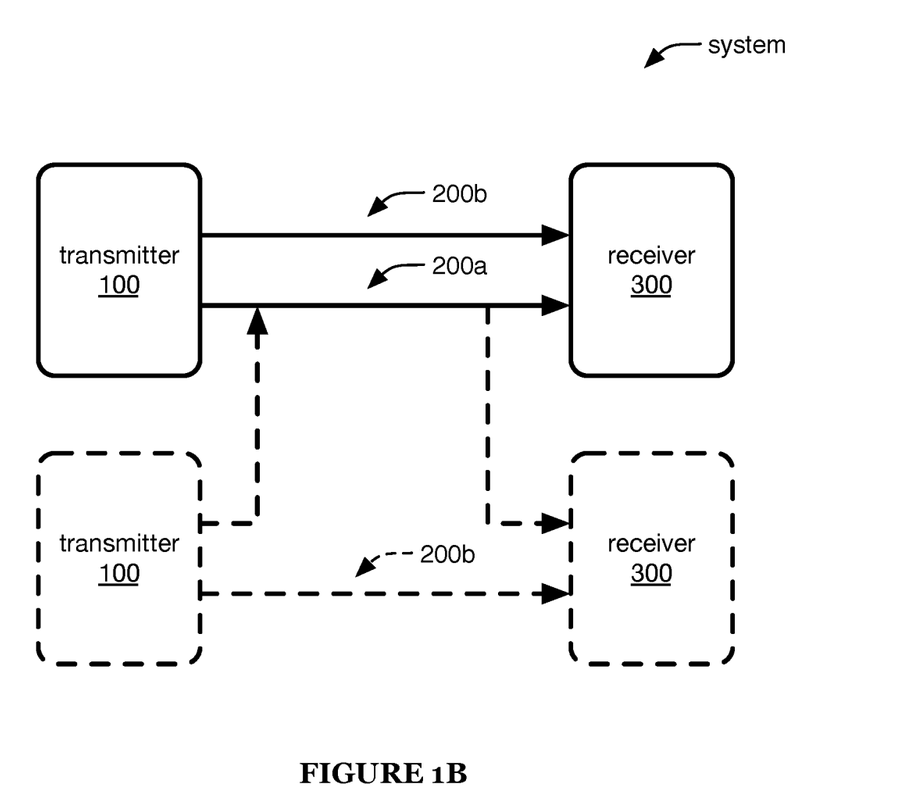
Figure 1C:
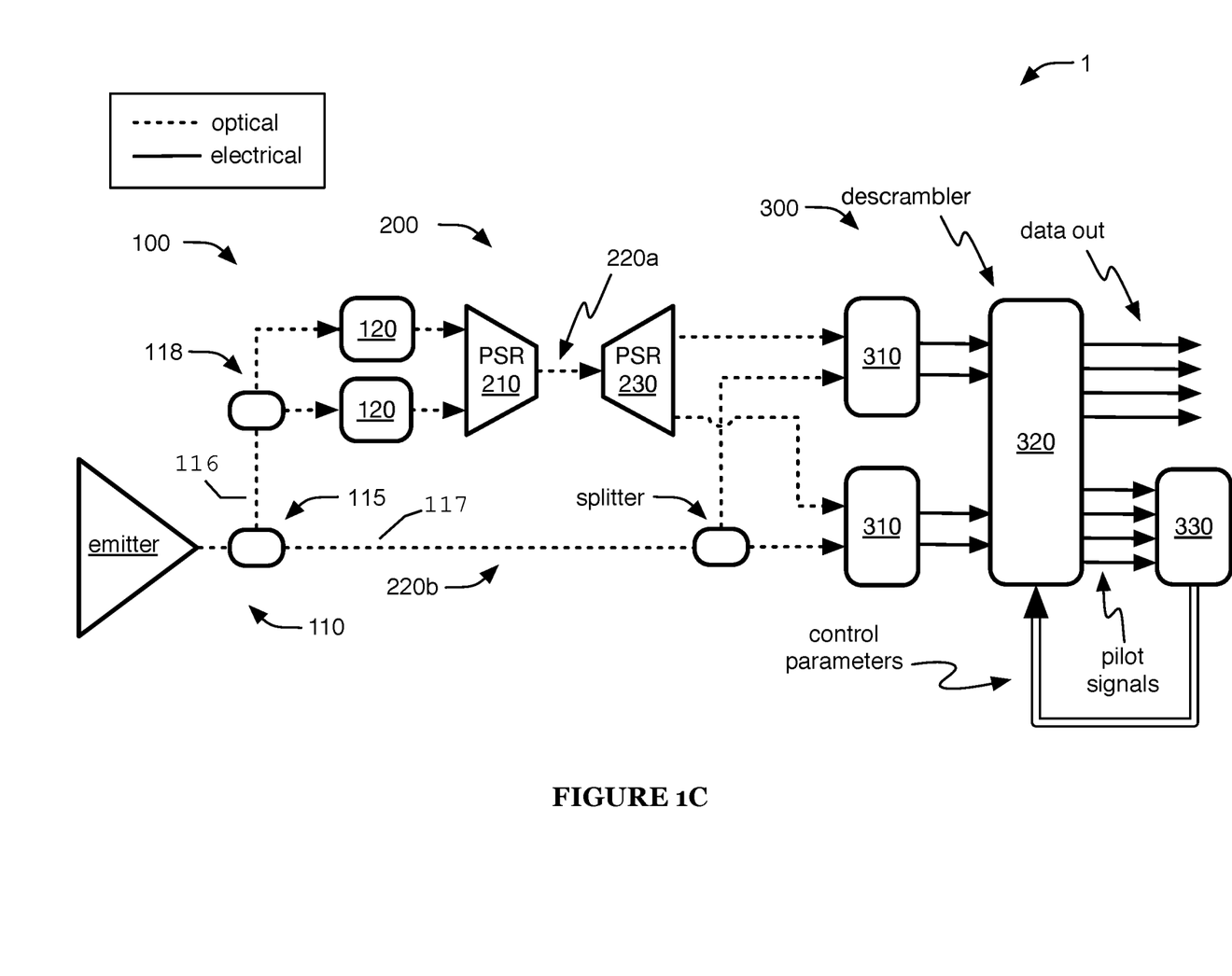
FIG. 1C is a schematic representation of an example of the system.

With reference to FIGS. 1A to 1C, an optical communication system 1 includes one or a plurality of optical transmitters 100, one or a plurality optical links 200, and/or one or a plurality of optical receivers 300. However, the optical communication system 1 may additionally or alternatively include any other suitable elements in any suitable arrangement, e.g. just the optical transmitter 100 or just the receiver 300.

A method for optical communication is preferably performed by the optical communication system 1 but may additionally or alternatively be performed by any other suitable system. The method preferably includes operating the system to transmit, receive, and/or descramble coherently modulated signals, e.g. as described below regarding functionality of the elements of the optical communication system 1. However, the method can additionally or alternatively include any other suitable elements performed in any suitable manner.

Figure 2A:
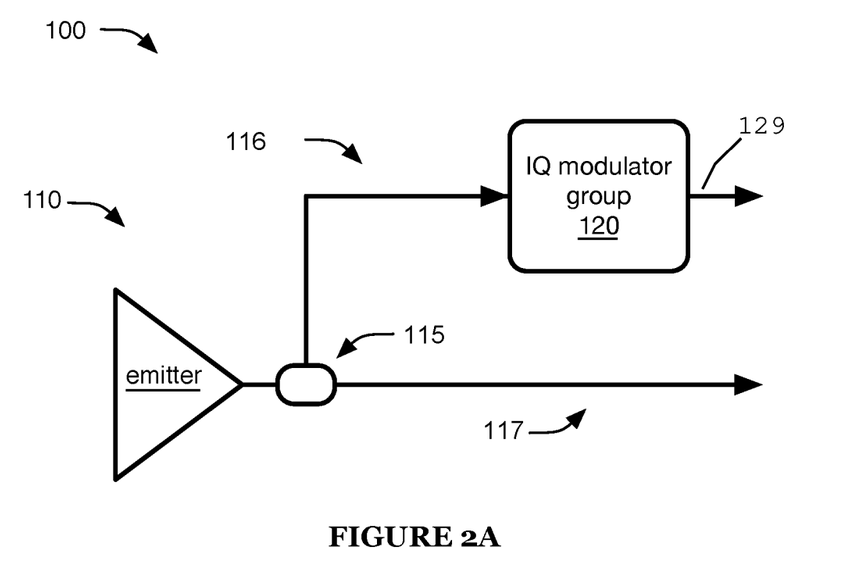
FIGS. 2A-2B are schematic representations of a first and second embodiment, respectively, of a transmitter of the system.
Figure 2B:
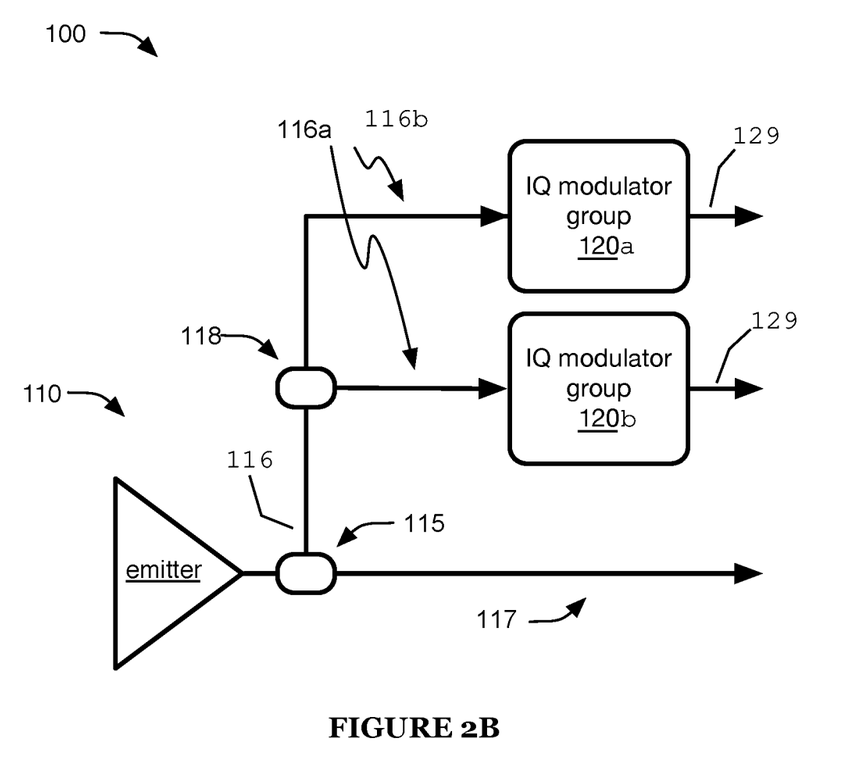

The one or a plurality of optical transmitters 100 may be configured to generate one or a plurality of input optical signals and to transmit a plurality of modulated optical data signals to the one or a plurality of receivers 300 via the one or a plurality of optical links 200. Each optical transmitter 100 preferably includes one or more optical sources (emitter) 110 and one or more modulator groups 120, e.g. in-phase/quadrature (IQ) modulators (as shown in FIGS. 2A & 2B). However, each optical transmitter 100 may additionally or alternatively include any other suitable elements in any suitable arrangement.

Each optical source 110 may be configured to provide the one or a plurality of input optical signals, e.g. each input optical signal having a different wavelengths $\lambda_1$ to $\lambda_n$. Only one optical source 110 is illustrated in FIGS. 1C, 2A and 2B, but the optical communication system 1 may comprise a plurality of optical sources 110. Each optical source 110 may comprise a distributed feedback (DFB) laser, a distributed Bragg reflector (DBR) laser, a fiber laser, or an external cavity laser (ECL), such as an integrable tunable laser assembly (ITLA). Each optical source 110 may include an optical amplifier, such as an Erbium-doped fiber amplifier (EDFA). Each plurality of coherent light input signals $\lambda_1$ to $\lambda_n$ may include some that are differently, e.g. orthogonally, polarized, e.g. TE or TM polarization, right-hand or left-hand circular polarization, etc., but may alternatively have any suitable polarization, e.g. linear, circular, elliptical, unpolarized, partially polarized, etc.

Each input optical signal $\lambda_1$ to $\lambda_n$ generated by each optical source 110 may be substantially unmodulated, having substantially constant intensity and phase, but may alternatively have any suitable modulation. However, each optical source 110 may be configured to provide light having any other suitable characteristics.

Each optical source 110 may include a main splitter 115, which is configured to split each input optical signal onto a signal path 116 to act as a main optical signal to be modulated by the IQ modulator group 120, and a reference path 117 to act as a local oscillator (LO) signal, such as shown by way of example in FIGS. 1C, 2A and 2B.

In some embodiments, one optical source 110 may be configured to provide multiple input optical signals, e.g. light of substantially different wavelengths $\lambda_1$ to $\lambda_n$. The multiple input optical signal $\lambda_1$ to $\lambda_n$ may originate from a single optical source 110, e.g. a comb source providing multiple wavelengths of light $\lambda_1$ to $\lambda_n$, or multiple optical sources, e.g. a separate laser for each laser wavelength of light $\lambda_1$ to $\lambda_n$.

In embodiments including a plurality of input optical signals with different wavelengths $\lambda_1$ to $\lambda_n$ from a single source, the plurality of input optical signals $\lambda_1$ to $\lambda_n$ may be separated, e.g. via an optical filter, onto different signal paths, e.g. wavelength-specific signal paths 116, such as one for each wavelength $\lambda_1$ to $\lambda_n$, while the reference signals may be combined onto a single reference path 117 or split onto multiple reference paths 117.

Each modulator group 120 may be configured to modulate the input optical signals on each signal path 116 based on an input electrical signal, e.g. an electrical signal received from an electronics module, such as one or more bitstreams. Each modulator group 120 may be configured to perform coherent modulation, such as quadrature-based modulation, e.g. quadrature amplitude modulation (QAM) such as QAM-16, QAM-32, QAM-64, etc.; QPSK; etc. However, at least some of the modulator groups 120 may additionally or alternatively be configured using any other suitable modulation approaches, such as on-off modulation, e.g. NRZ, pulse amplitude modulation, e.g. PAM-4, PAM-8, PAM-16, etc., phase-shift keying, e.g. BPSK, and/or any other suitable encoding. Although referred to herein as an IQ modulator group, a person of skill in the art will recognize that one or more of the modulator groups 120 may be configured to perform any other suitable modulation. For dual polarization IQ modulators each input optical signal may be separated into two coherent input optical signals by a splitter 118 for use as the first polarization (TM) Q and I signals and the second polarization (TE) Q and I signals for transmission to different modulators 120a and 120b (see FIGS. 1C and 2B).

Each modulator group 120 preferably receives the input optical signal, e.g. $\lambda_1$ to $\lambda_n$, from at least one the optical sources 110 via the signal path 116. In some embodiments, each modulator group 120 includes one or more optical modulators 122, e.g. a first optical modulator 122a for the I coherent optical signal and a second optical modulator 122b for the Q coherent optical signal. Each optical modulator 122 is configured to modulate the input optical signal (or portions thereof) based on one or more RF input electrical signals, e.g. data streams, forming modulated optical data signals. Each optical modulator 122 may comprise a Mach-Zehnder modulator (MZM), a resonator-based modulator, e.g. micro-resonators, such as micro-ring or micro-disk), and/or any other suitable modulator. All or at least some of the optical modulators 122 of the modulator group 120 are preferably substantially identical, but at least some may differ from each other.

In examples in which each modulator group 120 includes one or more MZMs, the MZMs may be controlled by biasing them to or near a null operation point, e.g. a minimum transmission point, and modulating the bias about that null point based on the signal to be encoded. For example, the MZMs may be controlled, such as described in "Coherent Optical Systems", Photonics Communications Research Laboratory, https://www.photonics.ntua.gr/OptikaDiktyaEpikoinwnias/Lecture_4_CoherentOptical_DSP.pdf, which is herein incorporated in its entirety by this reference.

In some embodiments, some or all of the optical modulators 122 may superimpose a pilot signal, e.g. a pilot tone, such as a single-frequency signal on one or both of the modulated optical data signals, e.g. the I modulated data signal or the Q modulated data signal. The pilot signal may have a much lower frequency than the modulated optical data signal, such as greater than or equal to 10 times, preferably 10 times to 100,000 times lower in frequency. For example, a pilot tone of approximately 1 MHz may be superimposed on one of the modulated optical data signals with a data rate of 10 MHz or greater, e.g. between 10 MHz and 100 GHz. There are a plurality of apparatuses and methods which may be able to add the pilot signal to the modulated optical data signal including: adding a low frequency electrical signal to the modulator RF input electrical signals, e.g. in the modulator driver; or directing the input optical signal or directing the modulated optical data signal through a secondary modulator, e.g. phase or intensity, which imparts the additional pilot signal.

Each modulator group 120 preferably outputs the corresponding modulated optical data signal to the optical link 200.

Figure 3:
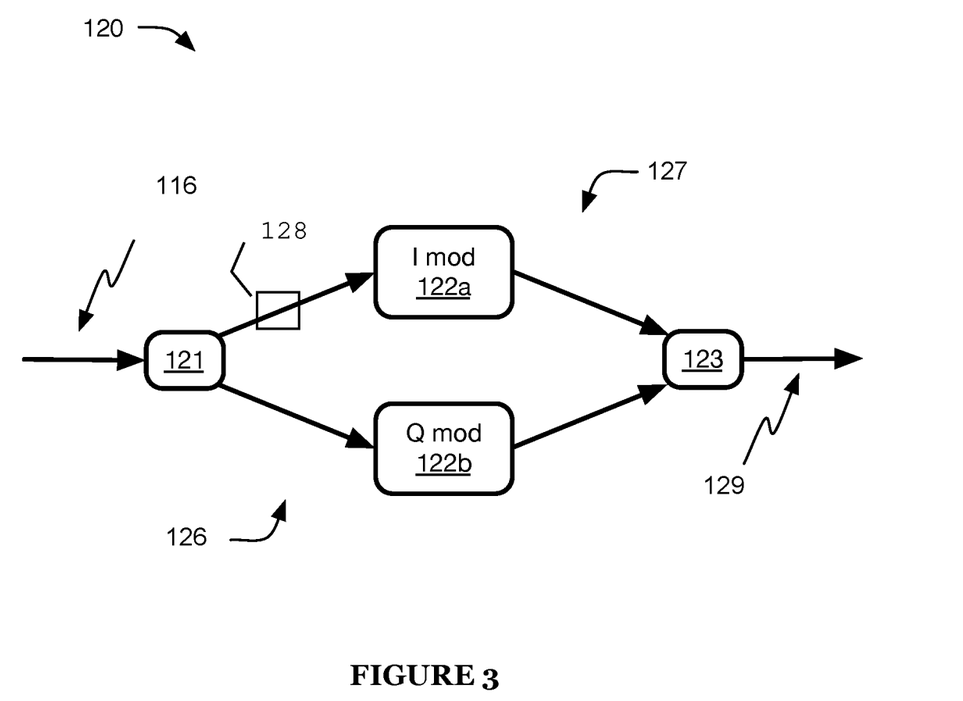
FIG. 3 is a schematic representation of an embodiment of an IQ modulator group of the transmitter.

With reference to FIG. 3, in one exemplary embodiment, the IQ modulator group 120 includes: a modulator splitter 121 for splitting the input optical signal into two coherent optical signals; first and second optical modulators 122a and 122b for modulating respective coherent (I and Q) optical signals; and a modulator coupler 123 for combining the two (I and Q) modulated coherent optical signals into one IQ optical signal. For example, the IQ modulator group 120 may include one or more elements, i.e. the 'Optical IQ modulator' described therein, described in "Coherent Optical Systems", Photonics Communications Research Laboratory, https://www.photonics.ntua.gr/OptikaDiktyaE-pikoinwnias/Lecture_4_CoherentOptical_DSP.pdf, which is herein incorporated in its entirety by this reference.

The modulator splitter 121 preferably functions to split the light, i.e. the input optical signal, from the optical signal path 116 onto two paths: an in-phase (I) path 126 and a quadrature (Q) path 127. For example, the modulator splitter 121 may be a 1×2 splitter, e.g. a 50:50 or 3 dB splitter, that splits the input optical signal from the single optical signal path 116 onto Q optical path 126 and I optical path 127 of the MZM, preferably splitting the input light substantially equally between the two paths 126 and 127, but alternatively splitting with any other suitable ratio is within the scope of the invention.

Each modulator 122a and 122b preferably functions to modulate light on one of the paths 126 and 126 output by the modulator splitter 121. Accordingly, this embodiment of the IQ modulator group 120 preferably includes two modulators, one arranged on each of these paths: an in-phase modulator 122a arranged on the I path 127 and a quadrature modulator 122b arranged on the Q path 126. For each modulator group 120, e.g. one or more modulators 122a or 122b thereof, the optical paths 126 and/or 127, may include a phase shifter (polarization rotator) 128, which is configured to impose an additional phase shift, e.g. substantially equal to $\pi/2$, between the Q and I paths, 126 and 127, such that the Q signal is $\pi/2$ out of phase from the I signal, thereby enabling the desired coherent modulation.

The modulator coupler 123 preferably functions to combine the modulated light from the Q and I paths 126 and 127 into a combined signal, e.g. a quadrature modulated optical output signal. The modulator coupler 123 is preferably a 2×1 coupler that accepts inputs from the two paths, e.g. Q and I paths 126 and 127, and combines them onto a single output path 129, which preferably carries the combined quadrature modulated optical signal to the optical link 200.

For dual polarization IQ modulators a phase shifter or polarization rotator may be provided in the modulator 120 or the multiplexer 210 for rotating the polarization of one of the IQ modulated signals to a polarization different (orthogonal) to the other, whereby the two polarized modulated optical IQ signals may be combined into a combined dual polarization coherent modulated optical signal by a combiner. However, each IQ modulator group 120 may additionally or alternatively include any other suitable elements in any suitable arrangement.

Figure 4A:
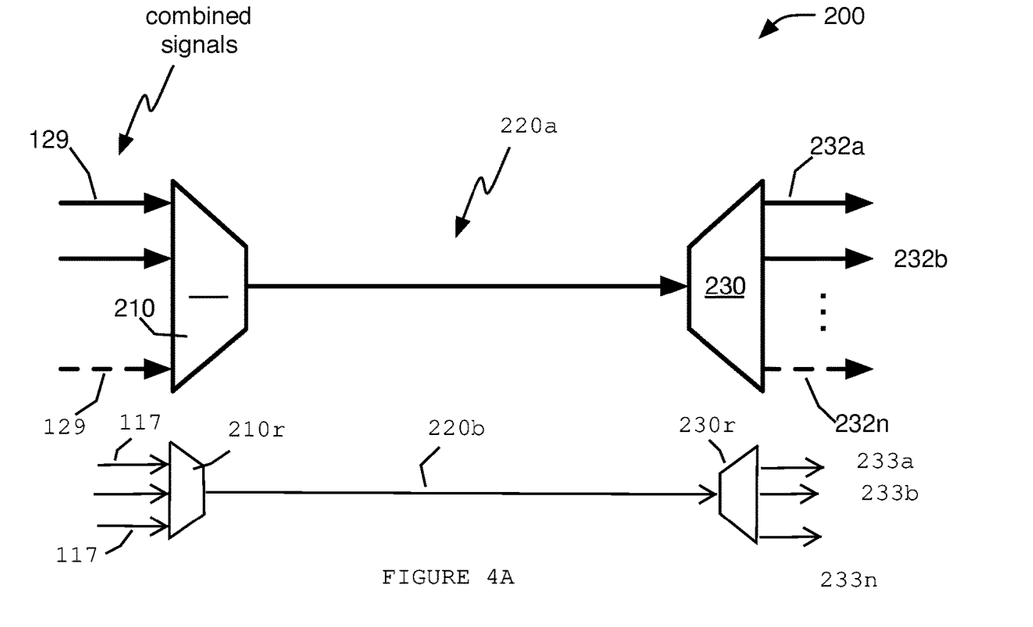
FIGS. 4A-4B are schematic representations of a first and second embodiment, respectively, of an optical link of the system.
Figure 4B:
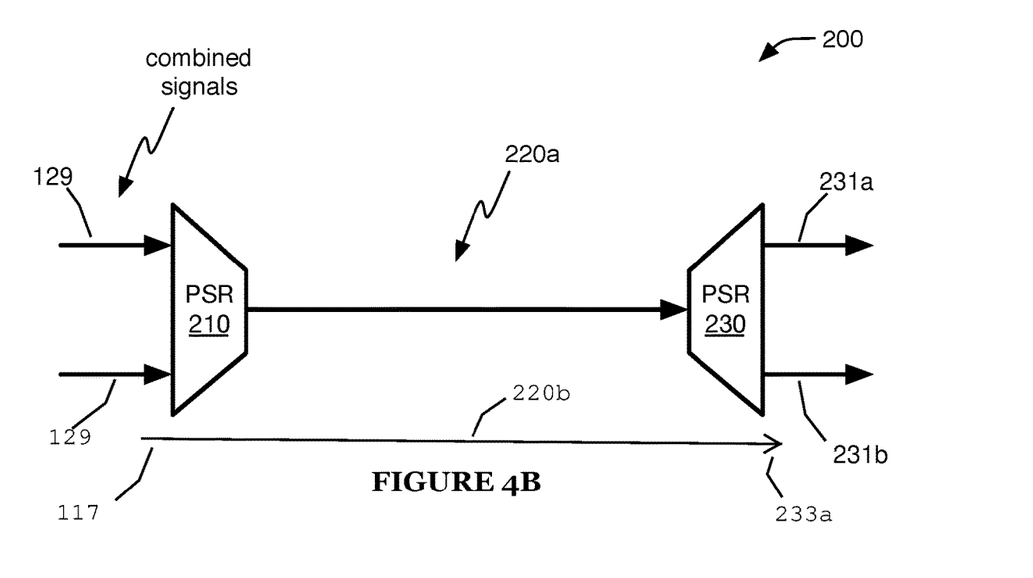

With reference to FIGS. 4A and 4B, each optical link 200 preferably includes a first optical path 220a, e.g. an optical waveguide path for supporting the combined modulated optical signals, and may optionally include one or more multiplexers 210 and/or demultiplexers 230. However, the optical link 200 may additionally or alternatively include any other suitable elements.

Each optical link 200 may be configured to carry light from the optical transmitter 100 to the optical receiver 300. The optical communication system 1 preferably includes one or more optical signal paths, e.g. the first optical path 220a, which are configured to carry the modulated optical signal or signals, e.g. the combined modulated optical signals output by the IQ modulator groups 120, and one or more reference paths, e.g. a second optical path 220b, which can function to carry the reference signal(s), e.g. the local oscillator (LO) signals.

Each optical multiplexer 210 may be configured to function to multiplex multiple optical signals, e.g. for optical waveguide (fiber) transmission, such as the modulated, e.g. coherently modulated optical data signals from the IQ modulator groups 120 from output paths 129 and/or the multiple LO (reference) signals, e.g. the reference signals for different wavelengths $\lambda 1$ to $\lambda n$ from reference paths 117. Multiplexing enables a more efficient optical transmission medium utilization, e.g. higher signal density per optical waveguide (fiber). Each multiplexer 210 may be configured to receive the combined modulated optical signals from a plurality of modulator groups 120 and/or from other multiplexers. Each multiplexer 210 may output a multiplexed optical signal to the signal optical link 200 (or to another multiplexer 210).

The multiplexers 210 may include polarization multiplexers, wavelength multiplexers for wavelength division multiplexing (WDM), and/or any other suitable multiplexers. In one example, the polarization multiplexer includes a polarization splitter/rotator (PSR) which: accepts two modulated inputs with the same polarization, e.g. one input each from two modulator groups 120, rotates the polarization of one of these inputs, e.g. from TE to TM or vice versa, and then combines the two inputs into a single polarization multiplexed output. The wavelength multiplexer 210 may be configured to combine multiple optical data signals that exist on different wavelength channels $\lambda 1$ to $\lambda n$ from each other, e.g. originating from different modulator groups 120.

In examples including multiple kinds of multiplexers 210, the multiplexers 210 may be configured in any suitable order. In a first example, the optical link 200 includes two wavelength multiplexers 210, followed by a PSR that combines the outputs of the wavelength multiplexers 210. In a second example, the optical link 200 includes a separate PSR for each wavelength channel, followed by a wavelength multiplexer 210. However, the optical link 200 can additionally or alternatively include any other suitable multiplexers 210 in any suitable arrangement.

A separate multiplexer 210r may be provided for combining all of the reference signals along reference paths 117 from the local oscillators onto a single optical path, e.g. a second optical path 220b. Multiplexers 210 may not be necessary if multiple wavelengths are not present.

Each optical path, e.g. first optical path 220a and second optical path 220b, may include one or more optical waveguides, e.g. on-wafer, optical fibers, e.g. single-mode optical fibers, free space optical paths, and/or any other suitable optical transmission media. In some variations, e.g. in which the optical paths 220a and 220b includes an optical fiber, mixing of multiplexed signals, e.g. polarization multiplexed signals, may occur during transit through the optical paths 220a and 220b, e.g. within a single mode optical fiber (SMOF). However, the optical link 200 can additionally or alternatively include any other suitable optical paths.

The demultiplexers 230 preferably function to separate the multiplexed modulated optical signal received from the first and second optical paths 220a and 220b onto multiple optical output paths, e.g. optical waveguides. Each optical output path preferably carries a single optical channel, e.g. single wavelength $\lambda_1$ to $\lambda_n$ with a single polarization. The demultiplexers 230 may include polarization demultiplexers, wavelength demultiplexers, and/or any other suitable demultiplexers. The demultiplexers 230 preferably include one or more demultiplexers corresponding to each kind of multiplexer used in the optical link 200, e.g. one or more polarization demultiplexers to separate polarization-multiplexed signals, and one or more wavelength demultiplexers to separate WDM signals, etc.

In one example, illustrated in FIG. 4B, the polarization demultiplexer includes a PSR that splits light from the optical path 220a onto two paths, e.g. waveguides 231a and 231b. The polarization splitter and rotator may split the two IQ optical signals with different, e.g. orthogonal, polarizations, and then rotate the polarization of one of the IQ optical signals, whereby both IQ optical signals have the same polarization, but on different waveguides, i.e. waveguides 231a and 231b. As noted above regarding the optical link 200, these demultiplexed signals may include mixing between multiple transmitted signals, e.g. may be scrambled relative to the transmitted signals.

With reference to the example illustrated in FIG. 4A, the wavelength demultiplexer 230 may be configured to separate wavelength multiplexed signals onto wavelength-specific paths 232a to 232n. Although high separation efficiency between the wavelengths can be a beneficial characteristic of embodiments of the wavelength demultiplexer 230, some embodiments of the system and method can tolerate significant leakage of different wavelengths onto the wavelength-specific optical paths 232a to 232n. After homodyne demodulation, other wavelengths will typically not substantially affect the demodulated output signals. Noise in these signals will typically arise at frequencies close to the frequency separation between wavelength channels $\lambda_1$ to $\lambda_n$, which is typically very high compared to the data rate. In one example, a 1 THz spacing between wavelength channels $\lambda_1$ to $\lambda_n$ results in leakage noise above approximately 1 THz. With a significantly lower data rate, such as 30 GHz, this high frequency leakage noise component can be filtered out and/or may average to substantially zero during signal sampling. However, in other embodiments, the optical communication system 1 and/or method may be less tolerant to leakage between the wavelength channels $\lambda_1$ to $\lambda_n$; in such embodiments, higher separation efficiency at the wavelength demultiplexer 230 may be preferable.

In some embodiments including multiple types of demultiplexers 230, the demultiplexers 230 may be arranged in any suitable order. In a first example, the optical link 200 includes a PSR, followed by two wavelength demultiplexers 230. In a second example, the optical link 200 includes a single wavelength demultiplexer 230, followed by one PSR for each wavelength channel $\lambda_1$ to $\lambda_n$. However, the optical links 200 can additionally or alternatively include any other suitable demultiplexers 230 in any suitable arrangement.

A separate demultiplexer 230r may be provided, which is configured for separating all of the reference signals from reference paths 117 onto separate optical paths, e.g. optical paths 233a to 233n.

Figure 5A:
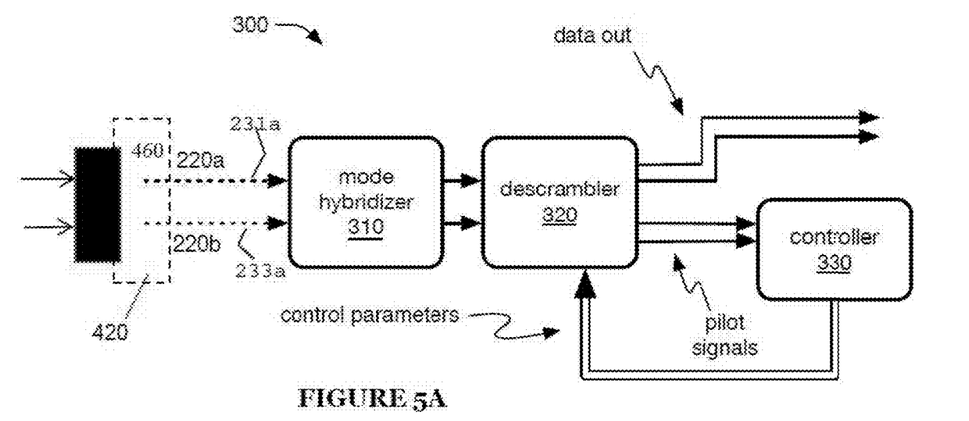
FIGS. 5A-5B are schematic representations of a first and second embodiment, respectively, of a receiver of the system.
Figure 5B:
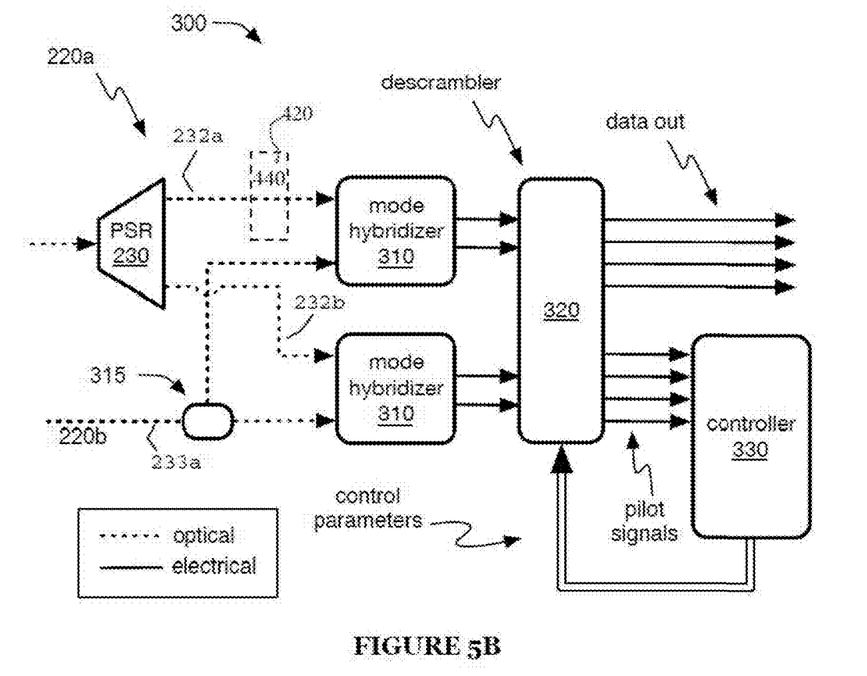

With reference to FIGS. 5A and 5B, the receiver 300 may be configured to generate one or more data streams, e.g. electronic data streams, based on the received modulated optical data signals. The optical communication system 1 preferably includes one receiver 300 for each wavelength channel $\lambda_1$ to $\lambda_n$. For any optical link 200, all of the optical signals in the same wavelength channel $\lambda_1$ to $\lambda_n$ are preferably received at the same receiver 300, i.e. for any multiplexing in the optical link 200 over characteristics other than wavelength, all such multiplexed optical signals of a given wavelength are preferably received at the same receiver 300. In an example illustrated in FIG. 5A, each modulated optical data signal with a distinct optical wavelength $\lambda_1$ to $\lambda_n$ are transmitted from optical link 200a via demultiplexer 230 and wavelength-specific optical paths 232a to 232n to a different receiver 300 along with the reference signal.

In another example, illustrated in FIG. 5B, each optical link 200a carries two differently polarized polarization channels for each wavelength; in this example, the optical communication system 1 preferably includes a different receiver 300 for each wavelength $\lambda_1$ to $\lambda_n$, and for any given wavelength $\lambda_1$ to $\lambda_n$, both polarization channels are preferably provided to the associated receiver 300. The receiver 300 preferably includes one or more mode hybridizers 310, a descrambler 320, and a controller 330. However, the receiver 300 may additionally or alternatively include any other suitable elements.

Figure 6:
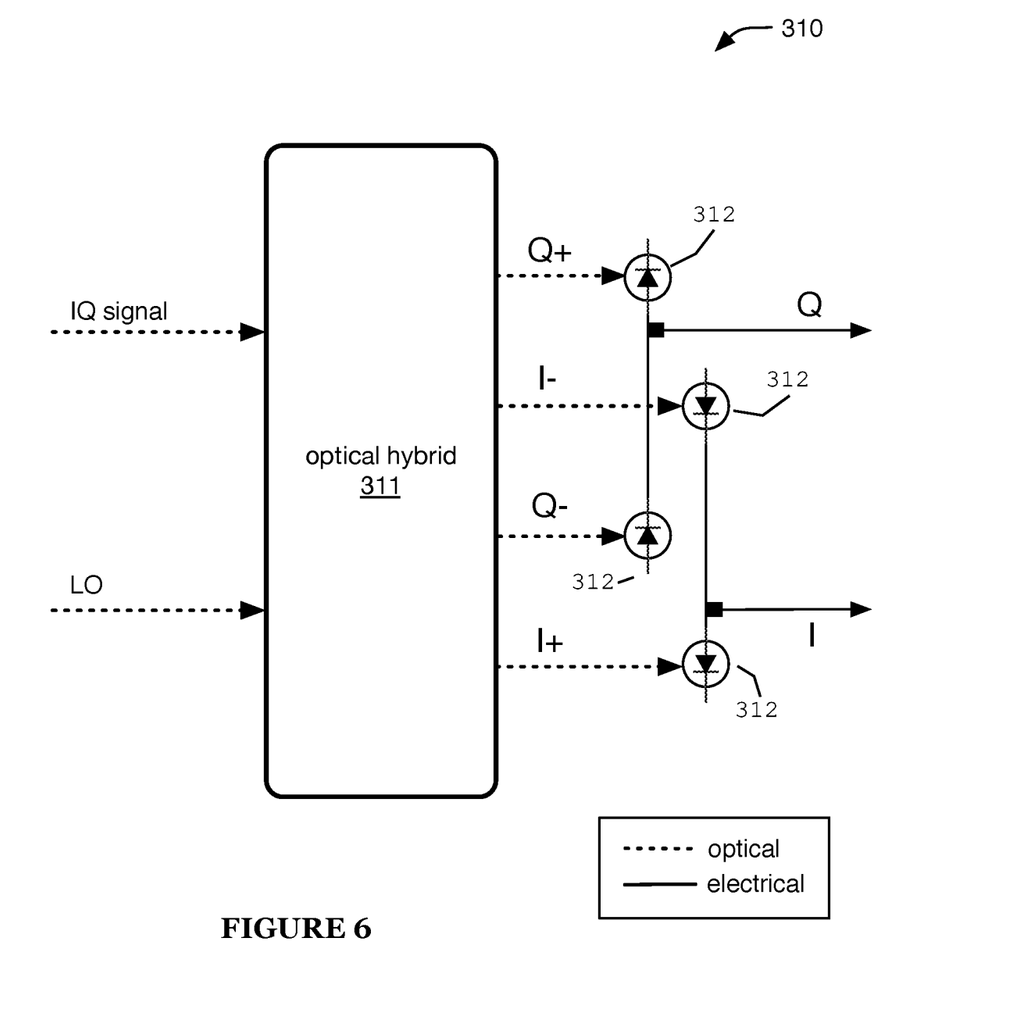
FIG. 6 is a schematic representation of an embodiment of a mode hybridizer of the receiver.

The receiver 300 may include one mode hybridizer 310 for each signal path 231a to 231b and 232a to 232n terminating at the receiver 300. For example, as illustrated in FIG. 5B, the receiver 300 may include two mode hybridizers 310, one for each polarization channel of each wavelength $\lambda_1$ to $\lambda_n$ associated with the receiver 300. Each hybridizer 310 preferably includes an optical hybrid 311 and a set of transducers 312, as shown in FIG. 6.

The optical hybrid 311 preferably functions to mix the modulated optical data signal, e.g. received from a signal path 231a to 231b and 232a to 232n of the optical link 200, and the reference signal from the local oscillator, thereby performing homodyne interference. Each optical hybrid 311 is preferably a 90° hybrid, such as a 2×4 multi-mode interferometer (MMI), but can additionally or alternatively be any other suitable optical hybrid.

Each optical hybrid 311 preferably accepts as input a single optical channel signal $\lambda_1$ to $\lambda_n$, e.g. the coherently modulated optical data signal, such as received from a single signal path 231a to 231b and 232a to 232n of the optical link 200, e.g. of the demultiplexer 230 of the optical link 200, and a corresponding local oscillator signal of the same wavelength channel as the coherently modulated optical data signal. In some embodiments of the optical communication system 1, e.g. FIG. 5B, a single local oscillator signal may be split, e.g. within the receiver 300 by LO splitter 315, within the optical transmitter 100, elsewhere, etc., and provided to multiple optical hybrids 311.

Each optical hybrid 311 preferably outputs a plurality of optical amplitude signals, wherein the amplitudes preferably correspond to components of the coherently modulated optical data signal. For example, each optical hybrid 311 may provide four outputs: two, e.g. the negative component portions (I−, Q−) and the positive component portions (I+, Q+), for each of two orthogonal signal components, e.g. the I and Q components, such as shown by way of example in FIG. 6. However, each optical hybrid 311 can additionally or alternatively perform any other suitable functions.

The transducers 312 preferably function to convert the optical amplitude signals into electrical signals, e.g. voltage or current signals. The transducers 312 preferably receive the optical amplitude signals from the optical hybrid 311, e.g. the four outputs of the optical hybrid (I−, Q−, I+, Q+), and output associated electrical signals (Q and I), which may be voltage signals but additionally or alternatively may be current signals and/or any other suitable signals.

The transducers 312 preferably include one or more photodetectors, e.g. photodiodes. For example, the transducers 312 may include one or more balanced photodiode pairs, each including two photodiodes. For example, the balanced photodiode pair may be configured to receive the positive and negative component portions of a signal component, e.g. I or Q component, and combine the two portions, e.g. by subtracting the negative portion from the positive portion, in the electrical domain to generate the total signal component, e.g. as shown in FIG. 6. Alternatively, the transducers 312 may include four separate photodiodes and, accordingly, can output four separate electrical signals corresponding to positive and negative component portions of a signal component, e.g. I or Q component.

In some embodiments, the transducers 312 may be configured to output any suitable electrical signal, e.g. current-based, voltage-based, etc. In examples in which the transducers 312 output current-based signals, the transducers 312 preferably include one or more transimpedance amplifiers (TIAs). For example, the transducers 312 may include two TIAs, e.g. one each for the I and Q components, or four TIAs, e.g. for the positive and negative portions of the I and Q components. However, the transducers 312 may additionally or alternatively include any other suitable elements in any suitable arrangement.

The descrambler 320 preferably functions to correct for mixing between multiple signal components. For example, this can include mixing between I and Q components, such as due to phase shifts resulting in phase differences, e.g. relative to the local oscillator, relative to each other, and/or relative to the other signal components, etc. In some examples, these phase shifts can arise due to thermal expansion of the optical paths, e.g. waveguides, but can additionally or alternatively include phase shifts arising for any other suitable reasons. Additionally or alternatively, this can include polarization mixing, such as occurring in the optical link 200, e.g. within the SMOF. However, the descrambler 320 can additionally or alternatively be configured to include correcting for any other suitable mixing between signal components.

The descrambler 320 may perform the correction in the analog (electrical) domain. In alternate embodiments, the descrambler 320 may additionally or alternatively perform correction in the digital (electrical) domain. However, in some such embodiments, this may require very fast sampling, e.g. at a digital signal processor, such as sampling at 100 GSa/s or more.

The descrambler 320 may perform one or more matrix operations, e.g. rotations, to correct for the mixing. The matrix operations are preferably performed based on control parameters received from the controller 330, e.g. based on the results of monitoring the pilot signals.

In a first example, in which no polarization mixing occurs, e.g. the optical link 200 does not include a polarization multiplexer (as in FIG. 5A), the descrambler 320 receives a single IQ pair (two electrical inputs) and performs a single rotation (in I-Q space/phase space) to correct for a phase shift (difference) between the modulated optical data signals and the local oscillator reference signal in the data output from the descrambler 320. Accordingly, the descrambler 320 may perform a virtual phase rotation performed by adding up currents, e.g. Q+ and Q−, and I+ and I−, from the transducers 312 with different correction parameters. For example, the different correction parameters can be based on the pilot signals, and in a particular example based on the amount of, i.e. portions of, the pilot signal measured on one of the modulated optical data signals, e.g. Q optical signal or I optical signal. In particular, the correction parameters can be based on correction factors used to correct for any deviation of the pilot signals received at the receiver 300 from what was expected of the pilot signals transmitted by the transmitter 100, e.g. no pilot signal in one of the I or Q optical signals or an even amount of pilot signal in both I and Q optical signals.

Figure 7A:
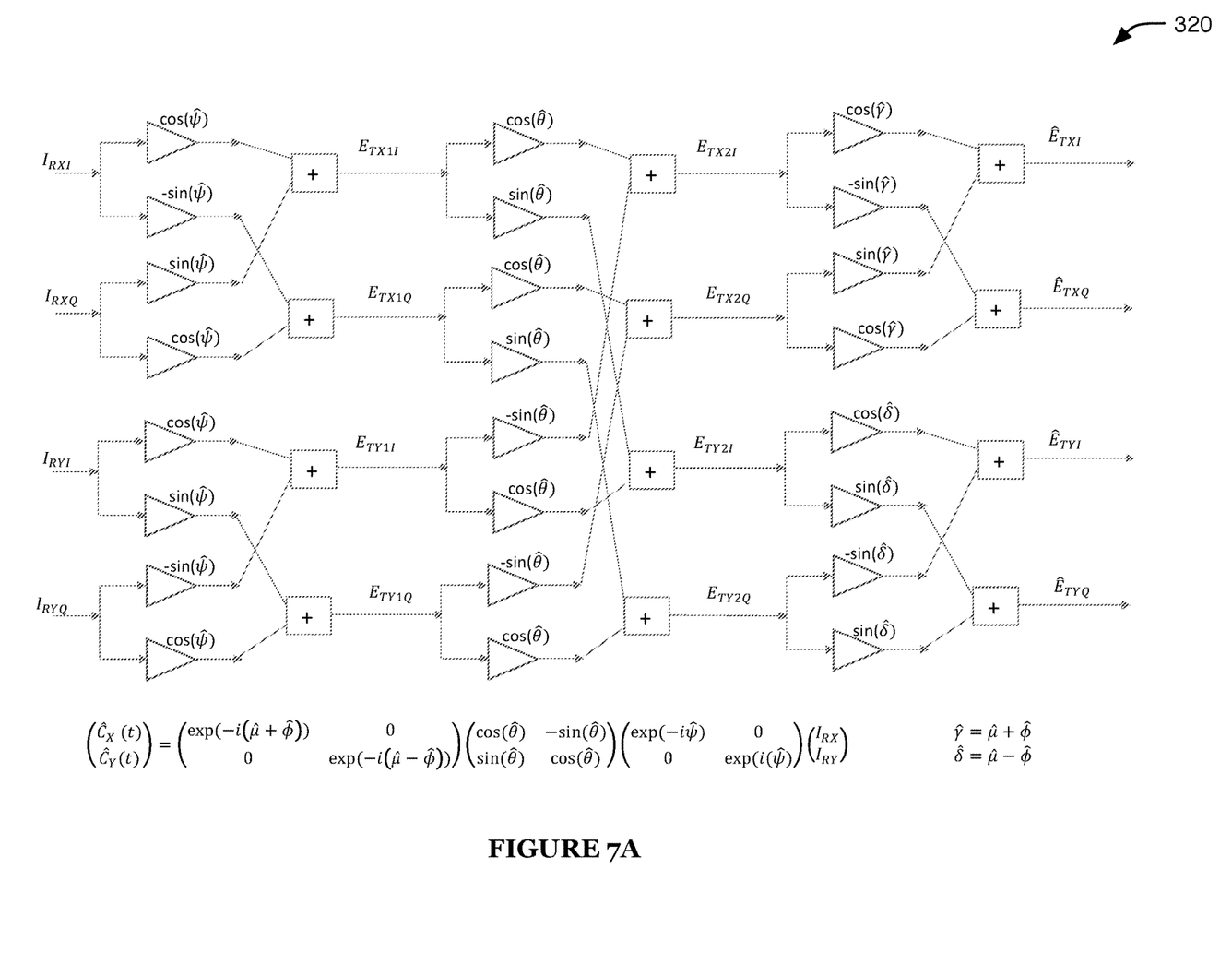
FIGS. 7A-7B are schematic representations of transformations applied in a first and second example, respectively, of a descrambler of the receiver.
Figure 7B:
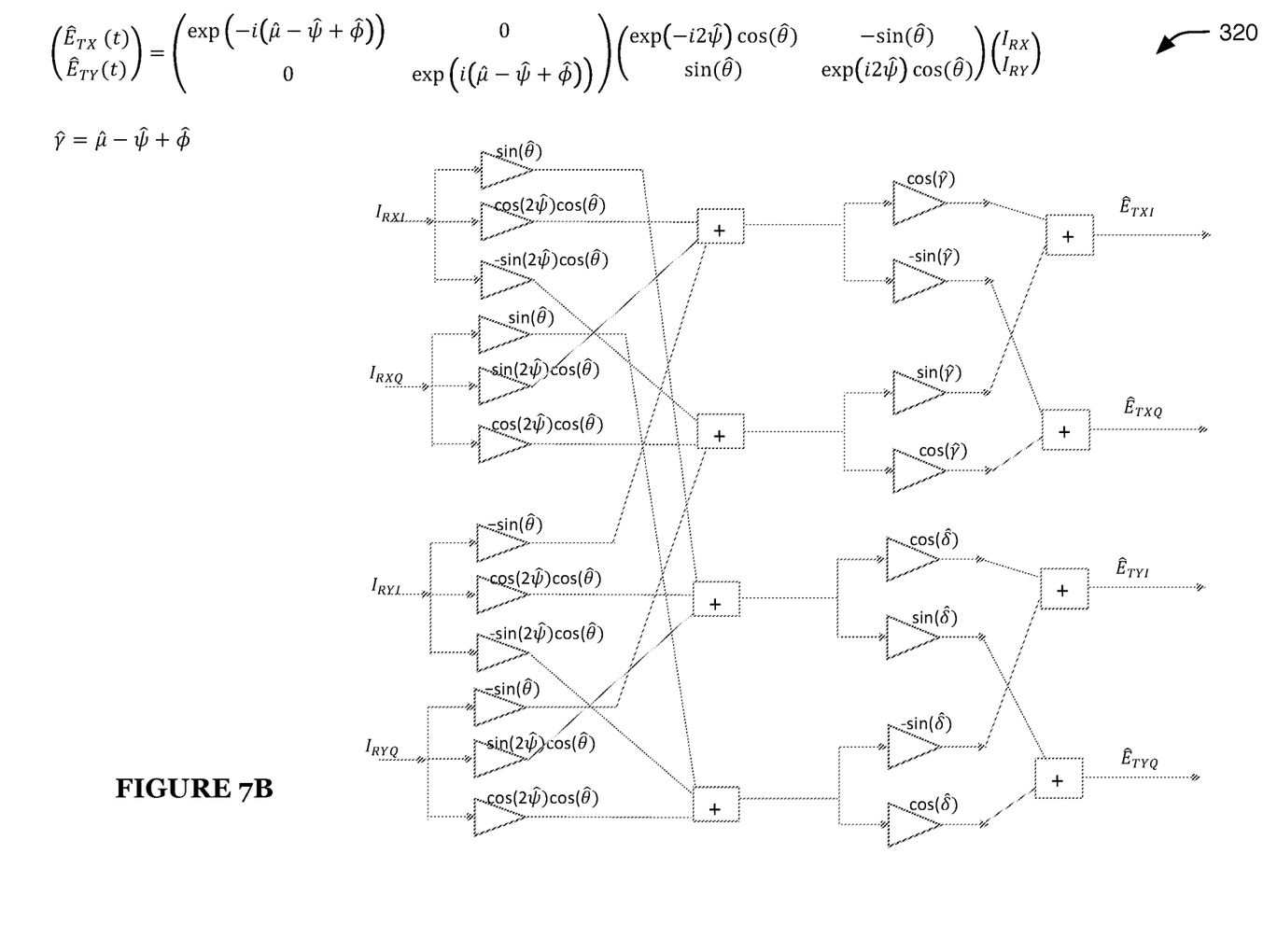

In a second example in which polarization mixing occurs, e.g. in which the optical link 200 includes a polarization multiplexer (as in FIG. 5B), the descrambler 320 receives two IQ pairs (four electrical inputs $I_{RXI}$, $I_{RXQ}$, $I_{RYI}$, $I_{RYQ}$), see FIGS. 7A and 7B. In this example, the descrambler 320 is configured to perform a plurality of matrix multiplication operations to correct for effects, such as transmitter-side phase shifts (differences) for the first and second transmitted IQ signals, polarization mixing in the optical link 200, and/or receiver-side phase shifts (differences) between the local oscillator reference signal and the modulated optical data signals, e.g. received IQ pair, at the first and second mode hybridizers 310, possibly including a polarization shift, e.g. as shown by way of specific examples in FIGS. 7A-7B. However, the descrambler 320 may additionally or alternatively be configured to perform any other suitable matrix operations to correct the received signals.

FIGS. 7A and 7B show a linear transformation being applied by the descrambler 320 to the set of scrambled input currents $I_{RXI}$, $I_{RXQ}$, $T_{RYI}$, $I_{RYQ}$ from the mode hybridizers 310 to recover the original unscrambled currents $E_{TXI}$, $E_{TXQ}$, $E_{TYI}$, and $E_{TYQ}$, which are the inputs and outputs, respectively, from the descrambler 320. FIGS. 7A and 7B illustrate examples of linear transformations whereby there are a plurality of parameters, such as $\varphi$, $\theta$ and $\gamma$, which will be determined based on a measurement of the pilot tones and a feedback loop. For example, one of the parameters, e.g. $\theta$, can be varied by the controller 330 until the electrical signal corresponding to the portion of the pilot tone at a specific I or Q channel port is minimized, and then the controller 330 proceeds to another parameter. All channels may have pilot tones, or may be only one or a plurality thereof.

In some embodiments, the descrambler 320 may be configured to separate the pilot signals from the (corrected) modulated optical data signals, e.g. as shown in FIGS. 5A & 5B. For example, the descrambler 320 may be configured to filter each modulated optical data signal based on frequency, such as splitting the modulated optical data signal onto a pilot signal output, by using a low-pass filter (or band-pass filter), and a data signal output, by using a high-pass filter (or band-pass filter). The descrambler 320 preferably outputs electrical signals corresponding to the pilot signals (and/or associated information, such as pilot signal amplitudes on each pilot signal output channel) to the controller 330. In examples in which the transmitted modulated optical data signal includes multiple pilot signals, e.g. of different frequencies, the descrambler 320 may be configured to provide all the pilot signals for a given output channel together, or can filter each pilot signal, e.g. based on frequency, onto separate outputs. The descrambler 320 may provide the corrected electrical data signals, preferably without the associated pilot signals, as an output of the optical communication system 1, e.g. providing the data stream to a clock and data recovery circuit.

In an alternate embodiment, the receiver 300 may include an optical descrambler 420. The optical descrambler 420 preferably functions to descramble the modulated optical data signals in the optical domain, rather than the electronic domain. For example, the optical descrambler 420 may be configured to receive the modulated optical data signals from the optical link 200 before they are provided to the mode hybridizer(s) 310. The optical descrambler 420 preferably includes a phase shifter 440 before each mode hybridizer 310, which can function to correct for the phase shift between each modulated optical data signal and each corresponding reference paths, thereby reducing or eliminating the phase difference between the modulated optical data signal and the local oscillator reference signal, before they are provided to the mode hybridizer 310. The optical descrambler 420 may additionally or alternatively include a polarization controller 460, which can function to correct for mixing between polarization-multiplexed signals. For example, the polarization controller 460 may be configured to accept from the optical path 220a or 220b prior to polarization demultiplexing by the polarization demultiplexer, two inputs signals, whose polarizations have been mixed, and can output signals that have been corrected for this polarization mixing. However, the optical descrambler 420 may additionally or alternatively include any other suitable elements in any suitable arrangement.

In some variations, the receiver 300 includes both an optical descrambler 420 and an electronic, e.g. analog electronic, descrambler 320, which may be configured to be used together to perform the desired signal descrambling, e.g. wherein one corrects for phase shifts between signal paths, e.g. 220a, and reference paths, e.g. 220b, while the other corrects for polarization mixing, wherein each performs a portion of the correction for a particular type of signal scrambling.

However, the descrambler 320 can additionally or alternatively perform any suitable operations in any suitable manner, e.g. in the optical domain and/or the electronic domain, and/or may include any other suitable elements in any suitable arrangement.

The controller 330, e.g. a channel estimator, may be configured to determine appropriate correction parameters for the descrambler 320 and/or the optical descrambler 420 based on the pilot signals received from the optical transmitter 100 via the descrambler 320 and/or the optical descrambler 420. As discussed above regarding the optical transmitter 100, the transmitted modulated optical data signals include one or more known pilot signals, e.g. low-frequency tones, such as tones in the range of 0.1-10 MHz and/or at any other suitable frequencies. The controller 330 preferably determines correction parameters for the descrambler 320 and/or the optical descrambler 420 such that the pilot signals output by the descrambler 320 and/or the optical descrambler 420 appear (detected or measured) on the correct outputs, e.g. the outputs (I signal or Q signal) corresponding to those on which the pilot signals were originally transmitted. The controller 330 preferably performs an iterative optimization process to achieve this goal, wherein the correction parameters provided to the descrambler 320 and/or the optical descrambler 420 are updated based on the effect the correction parameters have on the resulting measurement, i.e. corresponding electrical signal, of the descrambled pilot signals received by the controller 330 and/or on the remaining difference between the expected and observed pilot signals following the previous iteration. For example, the correction parameters may be iteratively adjusted until a magnitude of an electrical signal corresponding to a portion of the pilot signal detected on the wrong channel, e.g. the electrical data signal corresponding to the optical data signal with which the pilot signal was not transmitted, is reduced to zero.

In one example, in which the optical transmitter 100 provides a single pilot tone on the in-phase path 127 and the descrambler 320 and/or the optical descrambler 420 perform a single rotation, the controller 330 determines a single correction parameter, e.g. a phase angle to rotate the signal in the optical space or a value to add or subtract from electrical signal values in the electrical space. In this example, the controller 330 iteratively adjusts the correction parameters, based on a deviation of the received pilot signals from the expected pilot signals. In a first specific example, the expectation is that the full pilot tone amplitude appears on the in-phase channel and substantially no pilot tone appears on the quadrature channel. In this specific example, if a portion of the pilot signal appears, e.g. is measured or detected, on the quadrature channel output by the mode hybridizer 310, the controller 330 preferably adjusts the correction parameter in order to reduce the magnitude of the corresponding electrical signal of the pilot tone appearing on the quadrature channel. Analogously, in a second specific example in which the pilot tone is provided on the quadrature channel rather than the in-phase channel, the controller 330 would iteratively adjust to achieve the full amplitude of the corresponding electrical signal of the pilot tone on the output quadrature channel and none on the output in-phase channel. In this specific example, if a portion of the corresponding electrical signal of the pilot signal appears on the in-phase output, the controller 330 preferably adjusts the correction parameter in order to reduce the magnitude of the corresponding electrical signal of the pilot tone appearing on the in-phase channel.

However, the controller 330 may be configured to additionally or alternatively perform any other suitable functions and/or the receiver 300 can additionally or alternatively include any other suitable elements in any suitable arrangement. There may be many different ways to use the pilot signal, which may depend on how the pilot signal was introduced into the modulated optical data signal and the specifics of the descrambler 320. For example: the tone signal may be maximized in one channel, e.g. I and Q modulated coherent optical signals or differently polarized optical signals, and minimized in another; or the pilot signal may be balanced equally between the two channels. To be clear, the pilot signal does not need to be minimized in a channel to improve noise, as the pilot signal will be out of the frequency range of the modulated optical data signals and removed in that way. In embodiments of the optical communication system 1, each signal path, e.g. 116 and/or 232a, is preferably substantially the same length, e.g. within a tolerance threshold, such as less than 10, 10-30, 20-50, 30-100, 100-300, or more than 300 cm, as the corresponding reference path, e.g. 117 and/or 233a, used for homodyne detection. The similarity of these path lengths can function to ensure coherence between the optical data signal and the local oscillator reference signal. If a larger path length difference exists, characteristics of the optical source 110, e.g. laser output characteristics such as wavelength, may have drifted over the time delay corresponding to the path length difference, e.g. the optical data signal and the reference signal that interfere with each other at the optical hybrid 311 may have been generated too far apart in time for suitable homodyne interference.

However, the optical communication system 1 can additionally or alternatively include any other suitable elements in any suitable arrangement.

Although omitted for conciseness, the preferred embodiments include every combination and permutation of the various system components and the various method processes. Furthermore, various processes of the preferred method can be embodied and/or implemented at least in part as a machine configured to receive a computer-readable medium storing computer-readable instructions. The instructions are preferably executed by computer-executable components preferably integrated with the system. The computer-readable medium can be stored on any suitable computer readable media such as RAMs, ROMs, flash memory, EEPROMs, optical devices (CD or DVD), hard drives, floppy drives, or any suitable device. The computer-executable component is preferably a general or application specific processing subsystem, but any suitable dedicated hardware device or hardware/firmware combination device can additionally or alternatively execute the instructions.

The FIGURES illustrate the architecture, functionality and operation of possible implementations of systems, methods and computer program products according to preferred embodiments, example configurations, and variations thereof. In this regard, each block in the flowchart or block diagrams may represent a module, segment, step, or portion of code, which comprises one or more executable instructions for implementing the specified logical function(s). It should also be noted that, in some alternative implementations, the functions noted in the block can occur out of the order noted in the FIGURES. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As a person skilled in the art will recognize from the previous detailed description and from the figures and claims, modifications and changes can be made to the preferred embodiments of the invention without departing from the scope of this invention defined in the following claims.

The foregoing description of one or more example embodiments has been presented for the purposes of illustration and description. It is not intended to be exhaustive or to limit the invention to the precise form disclosed. Many modifications and variations are possible in light of the above teaching. It is intended that the scope of the disclosure be limited not by this detailed description.

We claim:

1. An optical system comprising:
a transmitter for transmitting optical signals onto an optical link, comprising:
an optical source configured for generating a first plurality of coherent optical signals, and a first local oscillator reference signal; and
a first optical modulator configured for modulating the first plurality of coherent optical signals forming a first plurality of modulated optical data signals, comprising a first in-phase modulated optical data signal and a first quadrature modulated optical data signal; and
a receiver configured to receive the first plurality of coherent optical signals, and the first local oscillator reference signal, the receiver comprising:
a first optical hybrid configured for generating a first in-phase electrical data signal and a first quadrature electrical data signal from the first in-phase modulated optical data signal, the first quadrature modulated optical data signal and the first local oscillator reference signal;
a phase corrector configured for at least partially correcting for a first phase difference between the first plurality of modulated optical data signals and the first local oscillator reference signal; and
a controller configured for determining a first correction parameter for at least partially correcting for the first phase difference, and for transmitting the first correction parameter to the phase corrector;
wherein the first optical modulator is also configured for generating a first pilot signal for transmission with the first plurality of coherent optical signals; and
wherein the controller is configured for determining the first correction parameter from the first pilot signal.

2. An optical system comprising:
a transmitter for transmitting optical signals onto an optical link, comprising:
an optical source configured for generating a first plurality of coherent optical signals, and a first local oscillator reference signal; and
a first optical modulator configured for modulating the first plurality of coherent optical signals forming a first plurality of modulated optical data signals, comprising a first in-phase modulated optical data signal and a first quadrature modulated optical data signal; and
a receiver configured to receive the first plurality of coherent optical signals, and the first local oscillator reference signal, the receiver comprising:
a first optical hybrid configured for generating a first in-phase electrical data signal and a first quadrature electrical data signal from the first in-phase modulated optical data signal, the first quadrature modulated optical data signal and the first local oscillator reference signal;
a phase corrector configured for at least partially correcting for a first phase difference between the first plurality of modulated optical data signals and the first local oscillator reference signal; and
a controller configured for determining a first correction parameter for at least partially correcting for the first phase difference, and for transmitting the first correction parameter to the phase corrector;
wherein the first plurality of coherent optical signals comprises four coherent optical signals, including a first polarized in-phase modulated optical data signal and a second polarized quadrature modulated optical data signal;
wherein the first optical modulator is further configured for modulating the first polarized in-phase modulated optical data signal and the second polarized quadrature modulated optical data signal;
a first optical multiplexer configured for combining the first plurality of coherent optical signals into a combined optical signal; and
a first optical demultiplexer configured for separating the combined optical signal into the first plurality of modulated optical data signals.

3. The optical system according to claim 1, wherein the first pilot signal has a frequency greater than or equal to 10 times lower in frequency than the first plurality of coherent optical signals.

4. The optical system according to claim 1, wherein the phase corrector is configured to receive the first in-phase electrical data signal and the first quadrature electrical data signal, and to perform a virtual rotation for at least partially correcting for the first phase difference by adjusting the first in-phase electrical data signal and the first quadrature electrical data signal based on the first correction parameter.

5. The optical system according to claim 4, further comprising an optical phase corrector including an optical phase shifter for at least partially correcting for the first phase difference.

6. The optical system according to claim 1, wherein the phase corrector comprises an optical phase corrector including an optical phase shifter for at least partially correcting the first phase difference.

7. The optical system according to claim 1, wherein the controller is configured to perform an iterative optimization process to correct for the first phase difference, wherein the first correction parameter provided to the phase corrector is updated by the controller based on an effect the phase corrector has on measurements of the first pilot signal using the first correction parameter.

8. The optical system according to claim 1, wherein the transmitter is configured to transmit the first pilot signal on only one of the first in-phase modulated optical data signal and the first quadrature modulated optical data signal; and
wherein, when a portion of the first pilot signal is detected by the receiver with the other of the first in-phase modulated optical data signal and the first quadrature modulated optical data signal, the controller is configured to adjust the first correction parameter based on a deviation of the first pilot signal received by the receiver from the first pilot signal transmitted by the transmitter.

9. The optical system according to claim 1, wherein the phase corrector is configured to separate the first pilot signal from the first plurality of modulated optical data signals.

10. The optical system according to claim 1, further comprising:
a second optical source configured for generating a second plurality of coherent optical signals at a different wavelength than the first plurality of coherent optical signals, and a second local oscillator reference signal;
a second optical modulator configured for modulating the second plurality of coherent optical signals forming a second plurality of modulated optical data signals, comprising a second in-phase modulated optical data signal and a second quadrature modulated optical data signal, and for generating a second pilot signal;
a first optical multiplexer configured for combining the first plurality of modulated optical data signals and the second plurality of modulated optical data signals into a combined optical signal;
a second optical multiplexer configured for combining the first local oscillator reference signal and the second local oscillator reference signal into a combined reference signal;
an optical link for transmitting the combined optical signal, the combined reference signal, the first pilot signal and the second pilot signal;
a first optical demultiplexer configured for separating the combined optical signal into the first plurality of modulated optical data signals and the second plurality of modulated optical data signals;
a second optical demultiplexer configured for separating the combined reference signal into the first local oscillator reference signal and the second local oscillator reference signal; and
a second optical hybrid configured for generating a second in-phase electrical data signal and a second quadrature electrical data signal from the second in-phase modulated optical data signal, the second quadrature modulated optical data signal and the second local oscillator reference signal;
wherein the phase corrector is also configured for at least partially correcting a second phase difference between the second plurality of modulated optical data signals and the second local oscillator reference signal; and
wherein the controller is also configured for determining a second correction parameter from the second pilot signal for at least partially correcting for the second phase difference, and for transmitting the second correction parameter to the phase corrector.

11. The optical system according to claim 2, wherein the first optical modulator is also configured for generating a first pilot signal for transmission with the first plurality of coherent optical signals; and
wherein the controller is configured for determining the first correction parameter from the first pilot signal.

12. An optical system comprising:
a receiver comprising:
a first optical hybrid configured for generating a first in-phase electrical data signal and a first quadrature electrical data signal from a first in-phase modulated optical data signal, a first quadrature modulated optical data signal and a first local oscillator reference signal;
a phase corrector configured for at least partially correcting a first phase difference between the first plurality of modulated optical data signals and the first local oscillator reference signal; and
a controller configured for determining a first correction parameter for at least partially correcting for the first phase difference, and for transmitting the first correction parameter to the phase corrector;
wherein the controller is also configured for determining the first correction parameter from a first pilot signal transmitted with the first quadrature modulated optical data signal and the first local oscillator reference signal.

13. The optical system according to claim 12, wherein the first pilot signal has a frequency greater than or equal to 10 times lower in frequency than the first in-phase modulated optical data signal and the first quadrature modulated optical data signal.

14. The optical system according to claim 12, wherein the phase corrector is configured to receive the first in-phase electrical data signal and the first quadrature electrical data signal, and to perform a virtual rotation for at least partially correcting for the first phase difference by adjusting the first in-phase electrical data signal and the first quadrature electrical data signal based on the first correction parameter.

15. The optical system according to claim 14, further comprising an optical phase corrector including an optical phase shifter for at least partially correcting for the first phase difference.

16. The optical system according to claim 12, wherein the phase corrector comprises an optical phase corrector including an optical phase shifter for at least partially correcting for the first phase difference.

17. The optical system according to claim 12, wherein the controller is configured to perform an iterative optimization process to correct for the first phase difference, wherein the first correction parameter provided to the phase corrector is updated by the controller based on an effect the phase corrector has on measurements of the first pilot signal using the first correction factor.

18. The optical system according to claim 12, wherein the first pilot signal is transmitted with only one of the first in-phase modulated optical data signal and the first quadrature modulated optical data signal; and wherein, when a portion of the first pilot signal is detected with the other of the first in-phase modulated optical data signal and the first quadrature modulated optical data signal, the controller is configured to adjust the first correction parameter based on a deviation of the first pilot signal received by the receiver from the first pilot signal transmitted by a transmitter.

19. The optical system according to claim 12, wherein the phase corrector is configured to separate the first pilot signal from the first in-phase modulated optical data signal and the first quadrature modulated optical data signal.

* * * * *